US012786153B2

(12) United States Patent
Bouguerra et al.

(10) Patent No.: US 12,786,153 B2
(45) Date of Patent: Nov. 3, 2026

(54) SYSTEMS AND METHODS FOR SMART MANAGEMENT OF INBOX

(71) Applicant: YAHOO ASSETS LLC, New York, NY (US)

(72) Inventors: Bassem Bouguerra, Long Beach, CA (US); Kevin Patel, Fremont, CA (US); Shashank Khanna, Fremont, CA (US); Shiv Shankar Sahadevan, San Jose, CA (US)

(73) Assignee: YAHOO ASSETS LLC, New York, NY (US)

( * ) Notice: Subject to any disclaimer, the term of this patent is extended or adjusted under 35 U.S.C. 154(b) by 273 days.

(21) Appl. No.: 18/476,426

(22) Filed: Sep. 28, 2023

(65) Prior Publication Data

US 2024/0356884 A1 Oct. 24, 2024

Related U.S. Application Data

(60) Provisional application No. 63/497,944, filed on Apr. 24, 2023.

(51) Int. Cl.
*H04L 51/214* (2022.01)
*G06F 16/34* (2019.01)
(Continued)

(52) U.S. Cl.
CPC .......... *H04L 51/214* (2022.05); *G06F 16/345* (2019.01); *G06F 40/166* (2020.01); *G06F 40/20* (2020.01); *G06F 40/205* (2020.01); *G06F 40/30* (2020.01); *G06F 40/40* (2020.01); *G06Q 10/1093* (2013.01); *H04L 51/02* (2013.01); *H04L 51/04* (2013.01); *H04L 51/046* (2013.01);
(Continued)

(58) Field of Classification Search
CPC ..... H04L 51/214; H04L 51/42; H04L 51/216; H04L 51/02; H04L 51/04; H04L 51/046; G06F 16/345; G06F 40/166; G06F 40/40; G06F 40/205; G06F 40/30; G06F 40/20; G06Q 10/1093; H04W 4/02
See application file for complete search history.

(56) References Cited

U.S. PATENT DOCUMENTS

| | | | | |
|---|---|---|---|---|
| 8,781,300 B2 * | 7/2014 | McCarthy | .......... | H04N 21/4334 386/294 |
| 11,914,550 B1 * | 2/2024 | Mapp | ................. | G06F 11/3409 |

(Continued)

*Primary Examiner* — Viet D Vu
(74) *Attorney, Agent, or Firm* — James J. DeCarlo; Greenberg Traurig, LLP

(57) ABSTRACT

In some implementations, the techniques described herein relate to a method including: (i) identifying, by a processor, electronic files stored in association with a user account, (ii) analyzing, by a large language model (LLM) executed by the processor, the electronic files and identifying, based on the LLM analysis, at least one file that is a candidate for deletion, (iii) compiling, by the processor, an electronic message comprising an output indicating deletion of the at least one file, (iv) causing display, by the processor, the electronic message, (v) receiving, by the processor, user input related to the at least one file, (vi) analyzing, by the LLM executed by the processor, the user input, and (vii) performing, by the processor based on the analysis of the user input via the LLM, an action on the at least one file conforming to the user input.

20 Claims, 5 Drawing Sheets

(51) Int. Cl.

| | |
|---|---|
| ***G06F 40/166*** | (2020.01) |
| ***G06F 40/20*** | (2020.01) |
| ***G06F 40/205*** | (2020.01) |
| ***G06F 40/30*** | (2020.01) |
| ***G06F 40/40*** | (2020.01) |
| ***G06Q 10/1093*** | (2023.01) |
| ***H04L 51/02*** | (2022.01) |
| ***H04L 51/04*** | (2022.01) |
| ***H04L 51/046*** | (2022.01) |
| ***H04L 51/216*** | (2022.01) |
| ***H04L 51/42*** | (2022.01) |
| ***H04W 4/02*** | (2018.01) |

(52) U.S. Cl.

CPC ............ *H04L 51/216* (2022.05); *H04L 51/42* (2022.05); *H04W 4/02* (2013.01)

(56) References Cited

U.S. PATENT DOCUMENTS

| | | | | |
|---|---|---|---|---|
| 12,277,233 | B1 * | 4/2025 | Agrawal | G06F 8/71 |
| 2007/0250578 | A1 * | 10/2007 | Hardy | G06Q 10/107 709/206 |
| 2008/0215541 | A1 * | 9/2008 | Li | G06F 16/951 |
| 2011/0047228 | A1 * | 2/2011 | Balasaygun | G06F 9/543 709/206 |
| 2017/0344224 | A1 * | 11/2017 | Kay | G06F 3/0482 |
| 2017/0364303 | A1 * | 12/2017 | Shih | G06F 3/0647 |
| 2022/0303233 | A1 * | 9/2022 | Tamura | G06F 16/162 |
| 2024/0314260 | A1 * | 9/2024 | Reale | A63F 13/65 |

* cited by examiner

SYSTEMS AND METHODS FOR SMART MANAGEMENT OF INBOX

CROSS-REFERENCE TO RELATED APPLICATIONS

This application claims the benefit of Provisional Patent Application No. 63/497,944, filed on Apr. 24, 2023, which is hereby incorporated by reference in its entirety.

BACKGROUND

A user typically receives hundreds of messages a day, many of which contain useful information to be referenced later and many of which do not. An account inbox of a user, if not tended to frequently throughout the day can become full and have several pages of messages. This easily builds up over time, with user inboxes containing hundreds or thousands of messages. Sometimes this can risk putting the user at a storage limit for their messaging service, especially when combined with other files such as shared documents, documents uploaded to storage, documents received as attachments, and the like. Combing through weeks, months or even years' worth of messages and documents for files which can be safely deleted to free up space is a tedious and error-prone task.

DETAILED DESCRIPTION

Figure 1:
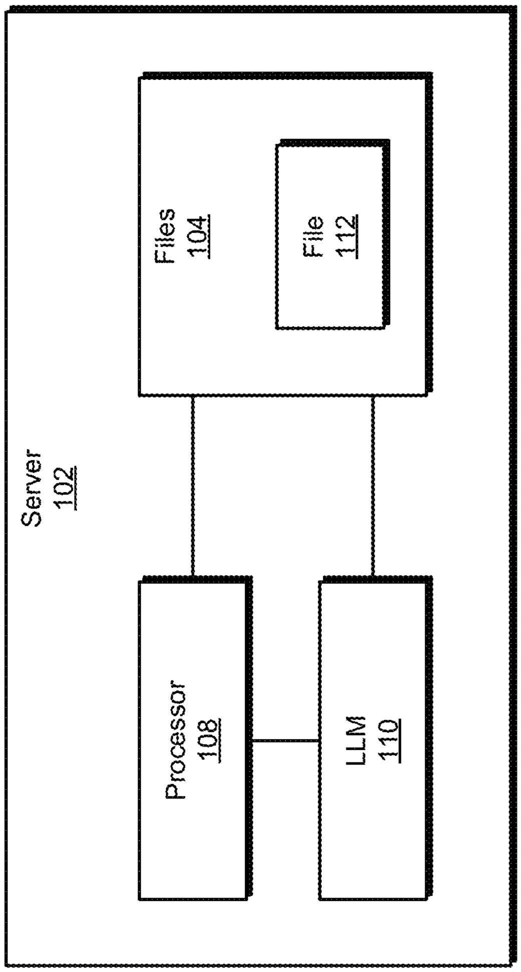
FIG. 1 is a block diagram illustrating a system for smart management of inbox according to some of the example embodiments of the present disclosure.

Various machine learning (ML) and artificial intelligence (AI) models are capable of generating and analyzing text. One example of such a model is a large language model (LLM). An LLM is a statistical model that predicts the next word in a sequence, given the previous words (often referred to as a "prompt"). LLMs are trained on massive datasets of text, and can be used for a variety of tasks, such as text generation, text summarization, and question answering. LLMs are typically composed of a neural network with many parameters (typically billions of weights or more). The neural network is trained on a large dataset of text and learns to predict the next word in a sequence, given the previous words. While LLMs are used primarily in the following description, the embodiments described herein can apply equally to other types of text generation models including, but not limited to, long short-term memory (LSTM) models, recurrent neural networks (RNNs), encoder-decoder models, transformer-based models, specialized convolutional neural networks (CNNs) and the like.

The example embodiments herein describe methods, computer-readable media, devices, and systems that enable users to free up valuable account storage space by intelligently identifying files that are no longer relevant, and can be deleted and/or moved to other storage locations. In some implementations, the embodiments described herein may use an LLM to analyze emails and/or files stored in association with an email account to determine which files are candidates for deletion. After verifying with a user, the embodiments described herein may delete the candidate files. In various examples, the LLM may analyze the contents, names, and/or metadata of files in comparison to current data about the user, messages, and/or user preferences in order to identify candidates for deletion.

In some embodiments, the techniques described herein relate to a method including: (i) identifying, by a processor, a plurality of electronic files stored in association with a user account, (ii) analyzing, by a large language model (LLM) executed by the processor, the plurality of electronic files and identifying, based on the LLM analysis, at least one file that is a candidate for deletion, (iii) compiling, by the processor, an electronic message, the electronic message comprising an output related to the identified at least one file, the output comprising content indicating deletion of the at least one file, (iv) causing display, by the processor, in association with a user interface of the user account, the electronic message, (v) receiving, by the processor, user input related to the at least one file, (vi) analyzing, by the LLM executed by the processor, the user input, and (vii) performing, by the processor based on the analysis of the user input via the LLM, an action on the at least one file conforming to the user input.

In some embodiments, the techniques described herein relate to a method wherein identifying the at least one file that is the candidate for deletion comprises comparing data within the at least one file to data within a profile of the user account and determining that the data within the at least one file does not match the data within the profile of the user account.

In some embodiments, the techniques described herein relate to a method wherein identifying the at least one file that is the candidate for deletion comprises analyzing content within an electronic message associated with the user account and determining that the content within the electronic message indicates that the at least one file is the candidate for deletion.

In some embodiments, the techniques described herein relate to a method wherein identifying the at least one file that is the candidate for deletion comprises receiving, by the processor, a file characteristic from the user and determining, by the large language model, that the at least one file comprises the file characteristic.

In some embodiments, the techniques described herein relate to a method wherein determining, by the large language model, that the at least one file comprises the file characteristic comprises analyzing content of the at least one file.

In some embodiments, the techniques described herein relate to a method wherein identifying the at least one file that is the candidate for deletion comprises analyzing a download history of the at least one file.

In some embodiments, the techniques described herein relate to a method wherein performing, by the processor, the action on the at least one file comprises deleting the at least one file.

In some embodiments, the techniques described herein relate to a method wherein performing, by the processor, the action on the at least one file comprises moving the at least one file from a current storage location to a different storage location.

In some embodiments, the techniques described herein relate to a method wherein performing, by the processor, the action on the at least one file comprises applying a tag to the at least one file.

In some embodiments, the techniques described herein relate to a method wherein performing, by the processor, the action on the at least one file comprises downloading the at least one file to a device operated by the user.

In some embodiments, the techniques described herein relate to a method wherein performing, by the processor, the action on the at least one file comprises unsubscribing from a message list associated with the at least one file.

In some embodiments, the techniques described herein relate to a method wherein the plurality of electronic files comprises a plurality of electronic messages and a plurality of electronic documents.

In some embodiments, the techniques described herein relate to a method wherein the user account comprises an account for an electronic messaging service.

In some embodiments, the techniques described herein relate to a non-transitory computer-readable storage medium for tangibly storing computer program instructions capable of being executed by a computer processor, the computer program instructions defining steps of: (i) identifying, by a processor, a plurality of electronic files stored in association with a user account, (ii) analyzing, by a large language model (LLM) executed by the processor, the plurality of electronic files and identifying, based on the LLM analysis, at least one file that is a candidate for deletion, (iii) compiling, by the processor, an electronic message, the electronic message comprising an output related to the identified at least one file, the output comprising content indicating deletion of the at least one file, (iv) causing display, by the processor, in association with a user interface of the user account, the electronic message, (v) receiving, by the processor, user input related to the at least one file, (vi) analyzing, by the LLM executed by the processor, the user input, and (vii) performing, by the processor based on the analysis of the user input via the LLM, an action on the at least one file conforming to the user input. In some embodiments, the techniques described herein relate to a non-transitory computer-readable storage medium wherein identifying the at least one file that is the candidate for deletion comprises comparing data within the at least one file to data within a profile of the user account and determining that the data within the at least one file does not match the data within the profile of the user account.

In some embodiments, the techniques described herein relate to a non-transitory computer-readable storage medium wherein identifying the at least one file that is the candidate for deletion comprises analyzing content within an electronic message associated with the user account and determining that the content within the electronic message indicates that the at least one file is the candidate for deletion.

In some embodiments, the techniques described herein relate to a non-transitory computer-readable storage medium wherein identifying the at least one file that is the candidate for deletion comprises receiving, by the processor, a file characteristic from the user and determining, by the large language model, that the at least one file comprises the file characteristic.

In some embodiments, the techniques described herein relate to a non-transitory computer-readable storage medium wherein determining, by the large language model, that the at least one file comprises the file characteristic comprises analyzing content of the at least one file.

In some embodiments, the techniques described herein relate to a non-transitory computer-readable storage medium wherein identifying the at least one file that is the candidate for deletion comprises analyzing a download history of the at least one file.

In some embodiments, the techniques described herein relate to a device including: a processor; and a non-transitory computer-readable storage medium for tangibly storing thereon logic for execution by the processor, the logic including instructions for: (i) identifying, by the processor, a plurality of electronic files stored in association with a user account, (ii) analyzing, by a large language model (LLM) executed by the processor, the plurality of electronic files and identifying, based on the LLM analysis, at least one file that is a candidate for deletion, (iii) compiling, by the processor, an electronic message, the electronic message comprising an output related to the identified at least one file, the output comprising content indicating deletion of the at least one file, (iv) causing display, by the processor, in association with a user interface of the user account, the electronic message, (v) receiving, by the processor, user input related to the at least one file, (vi) analyzing, by the LLM executed by the processor, the user input, and (vii) performing, by the processor based on the analysis of the user input via the LLM, an action on the at least one file conforming to the user input.

FIG. 1 is a block diagram illustrating a system for smart management of inbox according to some of the example embodiments.

The illustrated system includes a server 102. Server 102 may be configured with a processor 108 that may identify a plurality of electronic files 104 stored in association with a user account. Processor 108 may execute a LLM 110 that analyzes files 104 to identify at least one file 112 that is a candidate for deletion, as discussed herein. In some embodiments, processor 108 may suggest, to a user associated with the user account, deleting file 112. In some examples, processor 108 may receive user input related to file 112 and perform an action on file 112 conforming to the user input.

Although illustrated here on server 102, any or all of the embodiments described herein may be hosted by one or more servers and/or cloud-based processing resources. Additionally, or alternatively, the embodiments described herein may be hosted on a client device (e.g., a personal computing device such as a laptop, desktop, smart phone, etc.). Further details of these components are described herein and in the following flow diagrams.

In the various implementations, server 102, processor 108, and LLM 110 can be implemented using various types of computing devices such as laptop/desktop devices, mobile devices, server computing devices, etc. Specific details of the components of such computer devices are provided in the description of FIG. 5 which are not repeated herein. In general, these devices can include a processor and a storage medium for tangibly storing thereon logic for execution by the processor. In some implementations, the logic can be stored on a non-transitory computer readable storage medium for tangibly storing computer program instructions. In some implementations, these instructions can implement some of all of the methods described in FIG. 2 and FIG. 4.

In some implementations, files 104 can include any type of digital file. For example, files 104 may include without limitation text files, image files, render files, audio files, video files, save game files, template files, multimedia files and the like. In some examples, files 104 may include electronic messages, such as, for example, emails. In one example, files 104 may represent the content of a user's email inbox and associated folders (e.g., archives, sent, drafts, etc.) and/or stored files linked to a user's email account (e.g., uploaded files, received files, shared files, etc.).

Figure 2:
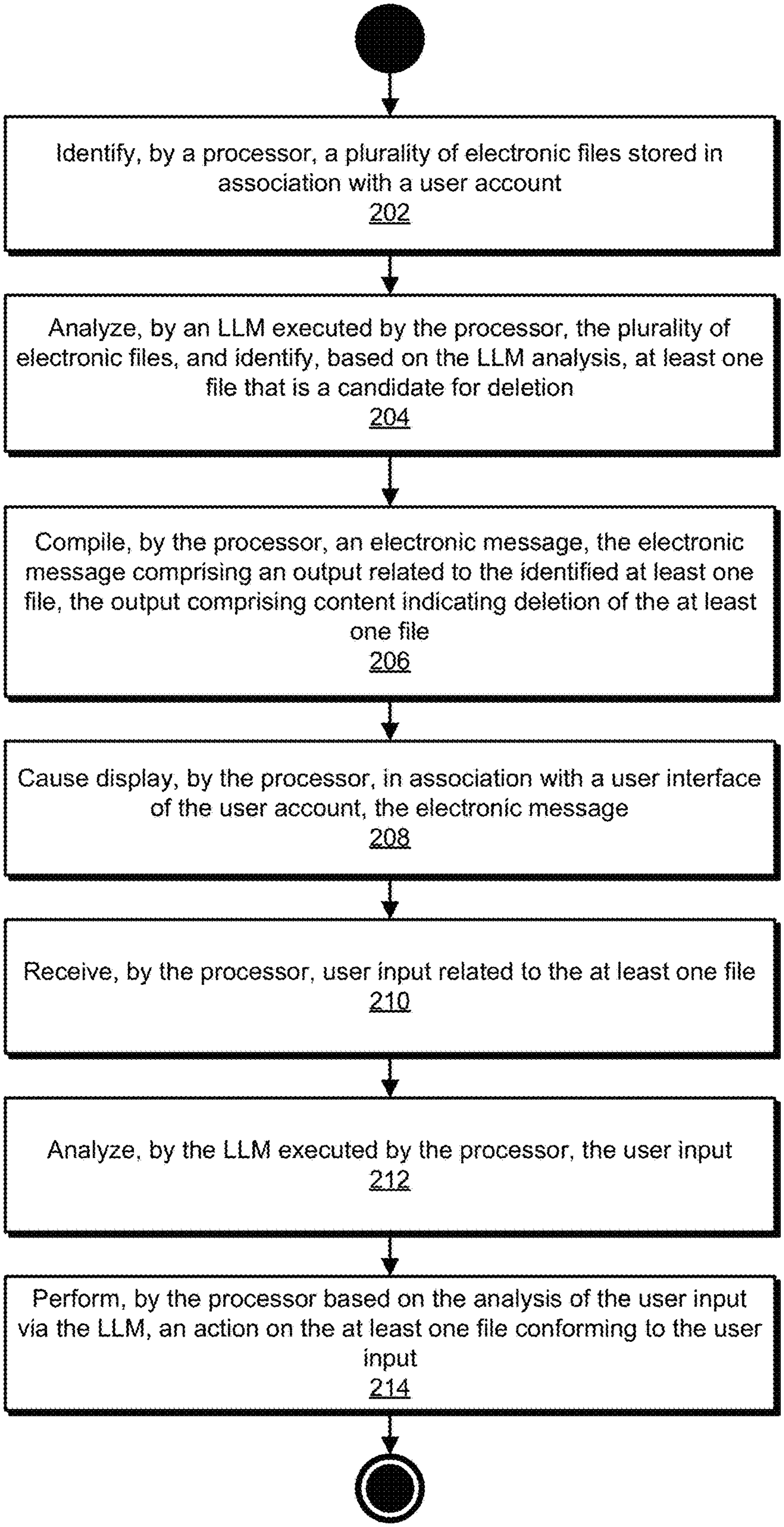
FIG. 2 is a flow diagram illustrating a method for smart management of inbox according to some of the example embodiments of the present disclosure.

FIG. 2 is a flow diagram illustrating a method for smart management of inbox according to some of the example embodiments. As discussed above, the inbox can be associated with an account of a user.

In step 202, the method can include identifying, by the processor, a plurality of electronic files stored in association with a user account.

In some implementations, the method may regularly identify files in order to determine candidates for deletion. For example, the method may identify files at a set time interval, such as once per day. Additionally, or alternatively, the method may identify files in response to a trigger. For example, the method may identify files in response to hitting a threshold of maximum storage used, such as 80%, 90%, or 95%. In another example, the method may identify files in response to input from a user, such as a user asking an LLM-assisted chatbot, "what files can I delete?"

In step 204, the method can include analyzing, by an LLM executed by the processor, the plurality of electronic files, and identifying, based on the LLM analysis, at least one file that is a candidate for deletion The LLM may analyze the plurality of files in a variety of ways. In some implementations, the method may use information from various sources in combination with information from the file to determine whether the file is a candidate for deletion.

Figure 3:
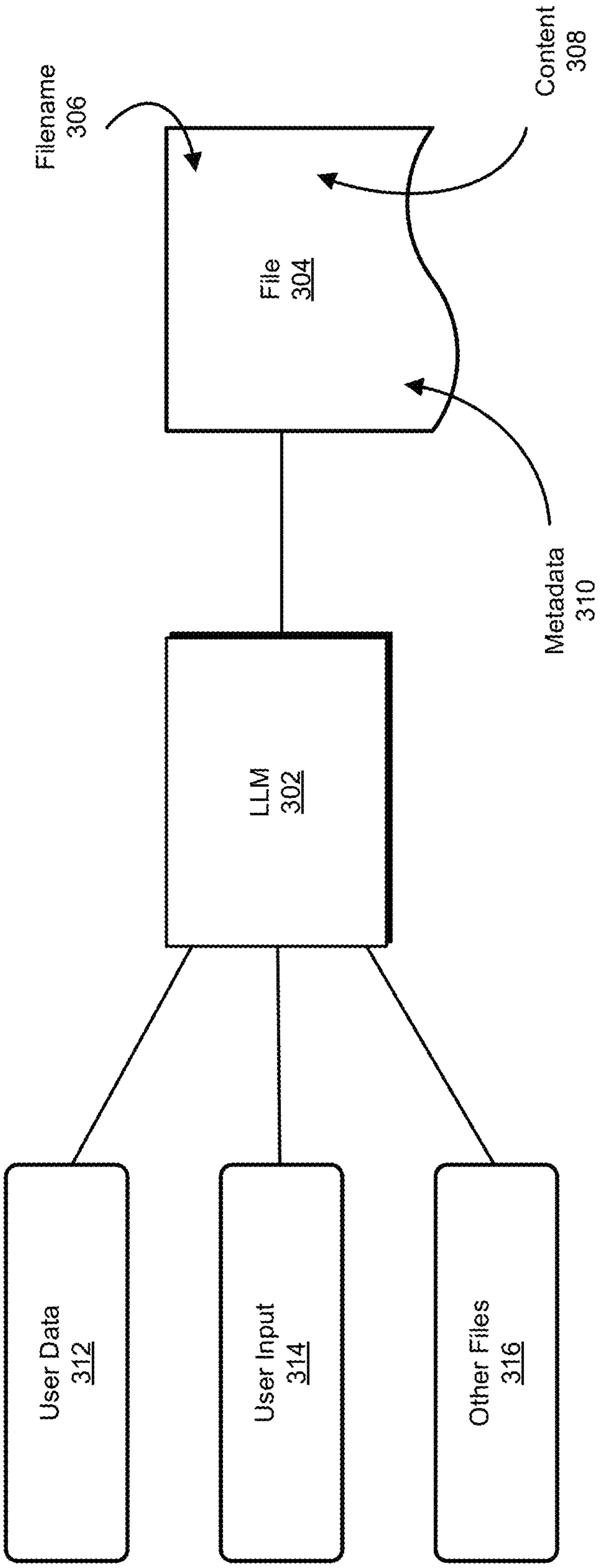
FIG. 3 is a block diagram illustrating a system for smart management of inbox according to some of the example embodiments of the present disclosure.

For example, as illustrated in FIG. 3, an LLM 302 may analyze a file 304 by examining the filename 306, content 308, and/or metadata 310. Examples of metadata may include, without limitation, date created, date modified, fields of an email (e.g., subject, to, etc.), geolocation data, file type, file size, and/or any other type of information about a file. In some examples, LLM 302 may compare and/or contextualize data about file 304 based on external data such as user data 312, user input 314, and/or other files 316.

For example, file 304 may be a mortgage document with metadata 310 indicating that file 304 was created ten years ago, filename 306 indicating that the document is a title search, and content 308 listing an address. In this example, LLM 302 may extract the address from content 308 and compare it to the user's current addressed stored in the user's profile in user data 312. In one example, if the two addresses do not match, the embodiments described herein may identify file 304 as a candidate for deletion due to being a title search for a house that the user no longer lives in and likely no longer owns.

In another example, a file may be an email with content that describes a trip itinerary. In one example, LLM 302 may identify a further email in other files 316 that is a cancellation for the first flight in the trip itinerary. In this example, the embodiments described herein may identify the file as a candidate for deletion due to being an itinerary for a trip the user did not take.

In one example, LLM 302 may receive a characteristic of the file as user input. For example, LLM 302 may receive user input 314, "delete files related to the home improvement project." In this example, LLM 302 may search for files with names and/or content related to home improvement and/or emails that are to or from contractors during dates associated with the home improvement project and identify these files as candidates for deletion. In another example, the embodiments described herein may receive user input, "delete files I haven't opened for more than five years" and may search for files with metadata indicating the files have not been opened in more than four years.

In some examples, the embodiments described herein may analyze a file's contents to determine whether the file contains action items and then compare the current date to any dates within the file to determine whether the file is a candidate for deletion. For example, if the file is an email containing text describing a coupon that is valid through Aug. 30, 2023 and the current date is Sep. 1, 2023, the embodiments described herein may determine that the email is a candidate for deletion. In another example, if the file is an email containing contents describing plans to meet up for brunch on a certain date that is prior to the current date, the embodiments described herein may determine that the email is a candidate for deletion.

In one implementation, the embodiments described herein may assign a binary true or false value for whether a file is a candidate for deletion. In other implementations, the embodiments described herein may assign a weighted rating to files. For example, if a file has not been accessed in ten years, the embodiments described herein may assign a higher weighting than if a file has not been accessed in one year. In another example, if an electronic message was sent to a mailing list, the embodiments described herein may assign a higher weighting than if the electronic message was sent only to the user. In one implementation, the embodiments described herein may present files to the user as candidates for deletion if the files have a rating over a certain threshold (e.g., a points-based and/or percentage-based threshold).

Figure 4:
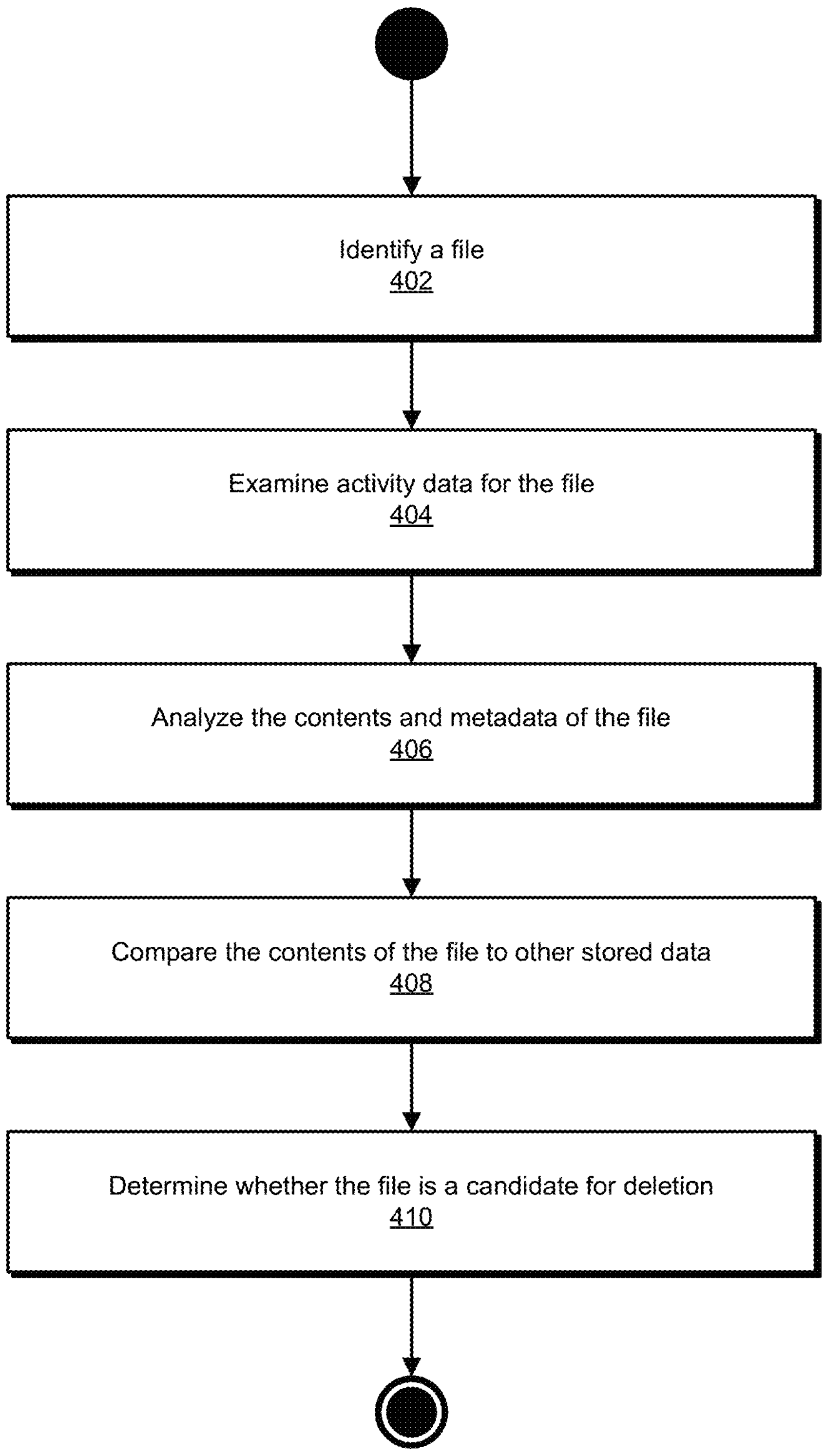
FIG. 4 is a flow diagram illustrating a method smart management of inbox according to some of the example embodiments of the present disclosure.

In some implementations, the LLM may examine various characteristics of files to determine whether they are a candidate for deletion. For example, as illustrated in FIG. 4, at step 402 the embodiments described herein may identify a file. At step 404, the embodiments described herein may examine activity data for the file. For example, the embodiments described herein may identify when the file was created, when the file was last modified, when the file was last opened, and any instances of the file being downloaded. In one example, if the file was last opened very recently (e.g., within the last day, within the last week, etc.), the embodiments described herein may determine the file is not a candidate for deletion or is less likely to be a candidate for deletion (e.g., in implementations where the embodiments described herein assign a weighted rating to files). In another example, if the file was downloaded in the past, the embodiments described herein may determine that the file is backed up elsewhere and is a candidate for deletion.

At step 406, the embodiments described herein may analyze the contents and metadata of the file. For example, the LLM may summarize the contents of the file and/or search the contents of the file for keywords or phrases (e.g., as specified by a user). At step 408, the embodiments described herein may compare the contents of the file to other stored data, as described above in connection with FIG. 3. At step 410, the embodiments described herein may determine whether the file is a candidate for deletion based on the information gathered in the previous steps.

Although listed in one order, steps 404 through 408 may be performed in various orders and/or with various additional intervening steps. In some implementations, the embodiments described herein may cease performing further steps after determining at a prior step that a file definitively is or is not a candidate for deletion, while in other implementations the embodiments described herein may perform all steps for every file under consideration.

Returning to FIG. 2, in step 206, the method can include compiling, by the processor, an electronic message, the electronic message comprising an output related to the identified at least one file, the output comprising content indicating deletion of the at least one file In step 208, the method can include causing display, by the processor, in association with a user interface of the user account, the electronic message.

In one implementation, the embodiments described herein may compile and present the user with a list of files that are candidates for deletion including information such as file name, date last accessed, and/or other relevant metadata. In some examples, the embodiments described herein may include the weighted rating of each file. For example, the embodiments described herein may list files in descending order of rating, from the most likely candidates for deletion to the least above a predetermined threshold. In some implementations, the embodiments described herein may display a user interface with elements such checkboxes next to file identifiers, a "check all" button, a "delete checked" button, and so forth. Additionally, or alternatively, the embodiments described herein may display a user interface with an LLM-assisted chatbot that enables the user to input text commands.

In step 210, the method can include receiving, by the processor, user input related to the at least one file. In step 212, the method can include analyze, by the LLM executed by the processor, the user input.

In one example, the embodiments described herein may receive user input confirming deletion of some or all of the files that are candidates for deletion. Additionally or alternatively, the embodiments described herein may receive user input suggesting additional actions and/or a refinement of the deletion criteria. For example, if the identification of files to delete was triggered by a user providing input of, "delete all files related to the home improvement project," the embodiments described herein may present the user with a list of files related to a bathroom remodel project and a shed construction project. In this example, the embodiments described herein may receive additional user input of "delete only files related to the bathroom remodel."

In step 214, the method can include performing, by the processor based on the analysis of the user input via the LLM, an action on the at least one file conforming to the user input.

In some examples, the embodiments described herein may delete the files identified as candidates for deletion. Additionally, or alternatively, the embodiments described herein may store the files in a different location from a previous storage location. For example, the embodiments described herein may download an email archive to local storage on a device operated by the user and then delete the instance of the email archive on the user's cloud storage. In another example, the embodiments described herein may move files from a short-term cloud storage location to a longer-term cloud storage location with a different data storage limit.

In some examples, the embodiments described herein may tag one or more files. For example, if the user has identified some files that were candidates for deletion but that the user does not wish deleted, the embodiments described herein may tag those files as, "do not delete." In another example, if a user is not sure about deleting certain files, the embodiments described herein may tag these files as "check again in one month."

In some implementations, the embodiments described herein may enable a user to unsubscribe from mailing lists associated with files that are candidates for deletion. For example, if the embodiments described herein determine that a file that is a candidate for deletion is an email with fields indicating that the email is addressed to a mailing list (e.g., the from field, to field, and/or subject line) and/or with contents containing an unsubscribe link, the embodiments described herein may provide the user with the option to unsubscribe from the mailing list in an addition to or as an alternative to deleting the email. In one example, if the embodiments described herein determine that a series of emails from a clothing store are candidates for deletion due to an activity history indicating the user has never interacted with any of the emails, the embodiments described herein may provide the user with the option to delete the emails and unsubscribe from the clothing store's mailing list. In one implementation, the embodiments described herein may use a browser agent or other suitable module to interact with the unsubscribe link and/or any associated web forms on behalf of the user.

Figure 5:
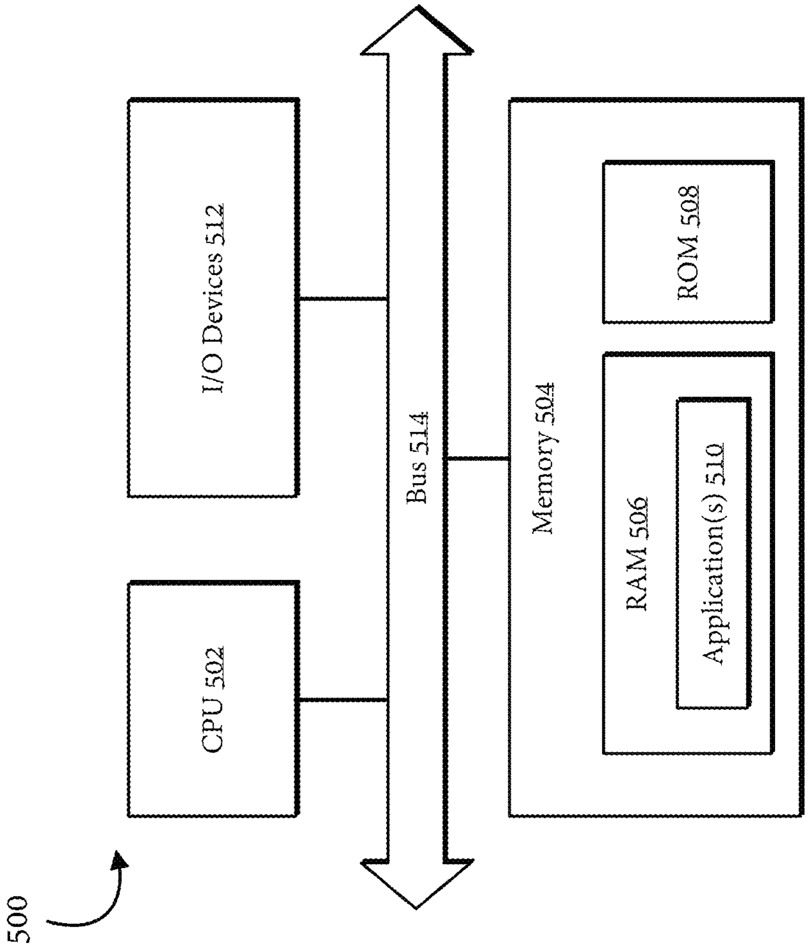
FIG. 5 is a block diagram of a computing device according to some embodiments of the disclosure of the present disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

identifying, by a processor, a plurality of electronic files stored in association with a user account;

analyzing, by a large language model (LLM) executed by the processor, the plurality of electronic files, the analysis comprising assigning, based on at least one characteristic of each of the plurality of electronic files, a weighted rating to each of the plurality of electronic files; and identifying, based on the assigned weighted ratings, at least one file that is a candidate for deletion, the identification comprising a determination that an assigned weighted rating for the at least one file is greater than a threshold;

compiling, by the processor, an electronic message, the electronic message comprising an output related to the identified at least one file, the output comprising content indicating deletion of the at least one file;

causing display, by the processor, in association with a user interface of the user account, the electronic message;

receiving, by the processor, a user command related to the at least one file;

analyzing, by the LLM executed by the processor, the user command; and performing, by the processor based on the analysis of the user command via the LLM, an action on the at least one file conforming to the user command.

2. The method of claim 1, wherein identifying the at least one file that is the candidate for deletion comprises:

comparing data within the at least one file to data within a profile of the user account; and determining that the data within the at least one file does not match the data within the profile of the user account.

3. The method of claim 1, wherein identifying the at least one file that is the candidate for deletion comprises:

analyzing content within an electronic message associated with the user account; and determining that the content within the electronic message indicates that the at least one file is the candidate for deletion.

4. The method of claim 1, wherein identifying the at least one file that is the candidate for deletion comprises:

receiving, by the processor, a file characteristic from the user; and determining, by the LLM, that the at least one file comprises the file characteristic.

5. The method of claim 4, wherein determining, by the LLM, that the at least one file comprises the file characteristic comprises analyzing content of the at least one file.

6. The method of claim 1, wherein identifying the at least one file that is the candidate for deletion comprises analyzing a download history of the at least one file.

7. The method of claim 1, wherein performing, by the processor, the action on the at least one file comprises deleting the at least one file, wherein deletion of the at least one file causes the user account to be modified.

8. The method of claim 1, wherein performing, by the processor, the action on the at least one file comprises moving the at least one file from a current storage location to a different storage location, wherein moving of the at least one file causes the user account to be modified.

9. The method of claim 1, wherein performing, by the processor, the action on the at least one file comprises applying a tag to the at least one file.

10. The method of claim 1, wherein performing, by the processor, the action on the at least one file comprises downloading the at least one file to a device operated by the user.

11. The method of claim 1, wherein performing, by the processor, the action on the at least one file comprises unsubscribing from a message list associated with the at least one file.

12. The method of claim 1, wherein the plurality of electronic files comprises a plurality of electronic messages and a plurality of electronic documents.

13. The method of claim 1, wherein the user account comprises an account for an electronic messaging service.

14. A non-transitory computer-readable storage medium for tangibly storing computer program instructions capable of being executed by a computer processor, the computer program instructions defining steps of:

identifying, by a processor, a plurality of electronic files stored in association with a user account;

analyzing, by a large language model (LLM) executed by the processor, the plurality of electronic files, the analysis comprising assigning, based on at least one characteristic of each of the plurality of electronic files, a weighted rating to each of the plurality of electronic files; and identifying, based on the assigned weighted ratings, at least one file that is a candidate for deletion, the identification comprising a determination that an assigned weighted rating for the at least one file is greater than a threshold;

compiling, by the processor, an electronic message, the electronic message comprising an output related to the identified at least one file, the output comprising content indicating deletion of the at least one file;

causing display, by the processor, in association with a user interface of the user account, the electronic message;

receiving, by the processor, a user command related to the at least one file;

analyzing, by the LLM executed by the processor, the user command; and performing, by the processor based on the analysis of the user command via the LLM, an action on the at least one file conforming to the user command.

15. The non-transitory computer-readable storage medium of claim 14, wherein identifying the at least one file that is the candidate for deletion comprises:

comparing data within the at least one file to data within a profile of the user account; and determining that the data within the at least one file does not match the data within the profile of the user account.

16. The non-transitory computer-readable storage medium of claim 14, wherein identifying the at least one file that is the candidate for deletion comprises:

analyzing content within an electronic message associated with the user account; and determining that the content within the electronic message indicates that the at least one file is the candidate for deletion.

17. The non-transitory computer-readable storage medium of claim 14, wherein identifying the at least one file that is the candidate for deletion comprises:

receiving, by the processor, a file characteristic from the user; and determining, by the LLM, that the at least one file comprises the file characteristic.

18. The non-transitory computer-readable storage medium of claim 17, wherein determining, by the LLM, that the at least one file comprises the file characteristic comprises analyzing content of the at least one file.

19. The non-transitory computer-readable storage medium of claim 14, wherein identifying the at least one file that is the candidate for deletion comprises analyzing a download history of the at least one file.

20. A device comprising:

a processor; and a non-transitory computer-readable storage medium for tangibly storing thereon logic for execution by the processor, the logic comprising instructions for:

identifying, by the processor, a plurality of electronic files stored in association with a user account;

analyzing, by a large language model (LLM) executed by the processor, the plurality of electronic files, the analysis comprising assigning, based on at least one characteristic of each of the plurality of electronic files, a weighted rating to each of the plurality of electronic files; and identifying, based on the assigned weighted ratings, at least one file that is a candidate for deletion, the identification comprising a determination that an assigned weighted rating for the at least one file is greater than a threshold;

compiling, by the processor, an electronic message, the electronic message comprising an output related to the identified at least one file, the output comprising content indicating deletion of the at least one file;

causing display, by the processor, in association with a user interface of the user account, the electronic message;

receiving, by the processor, a user command related to the at least one file;

analyzing, by the LLM executed by the processor, the user command; and performing, by the processor based on the analysis of the user command via the LLM, an action on the at least one file conforming to the user command.

* * * * *